April 3, 1934.　　R. M. GORDON　　1,953,222
LUBRICATION SYSTEM
Filed April 30, 1931　　3 Sheets-Sheet 1
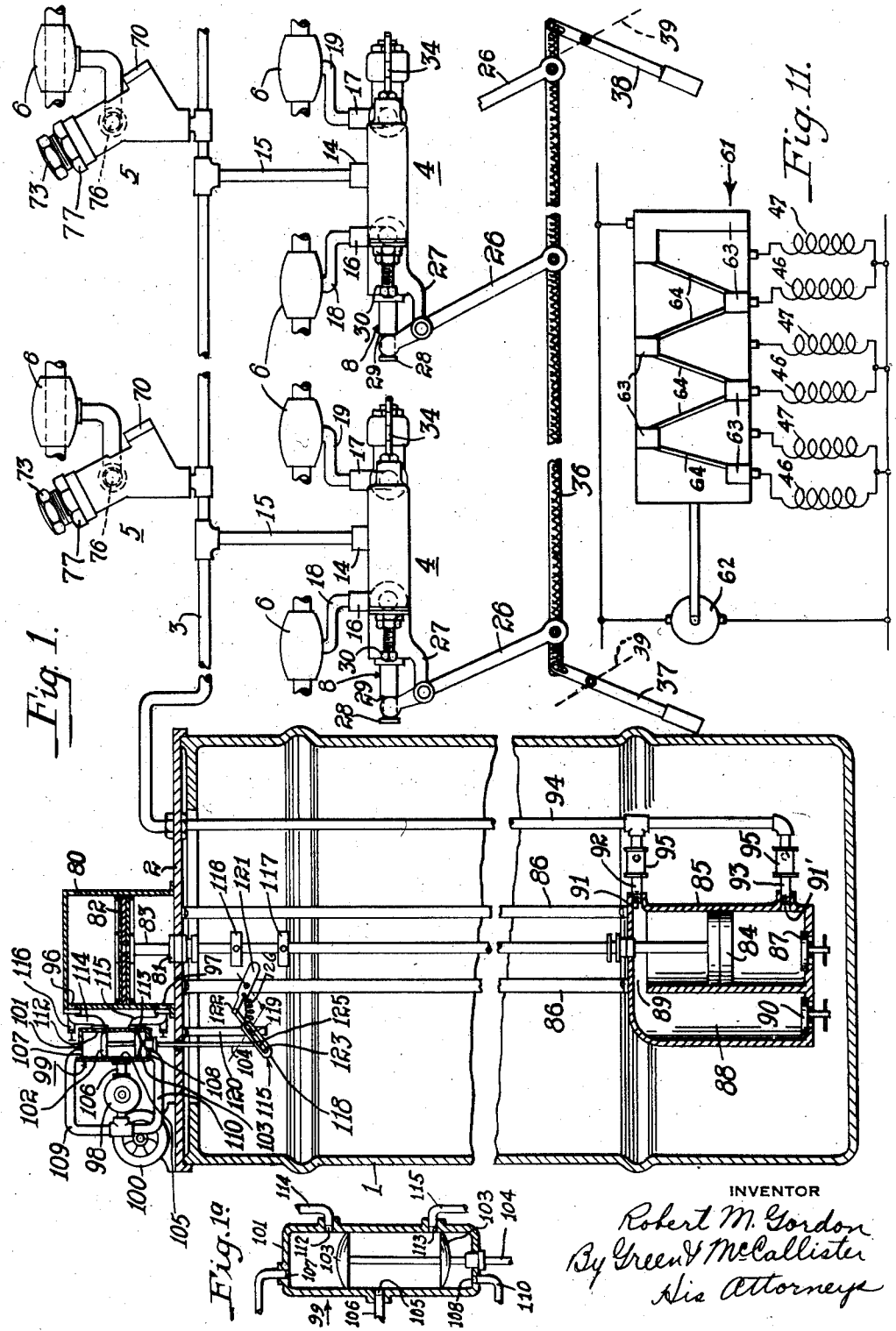

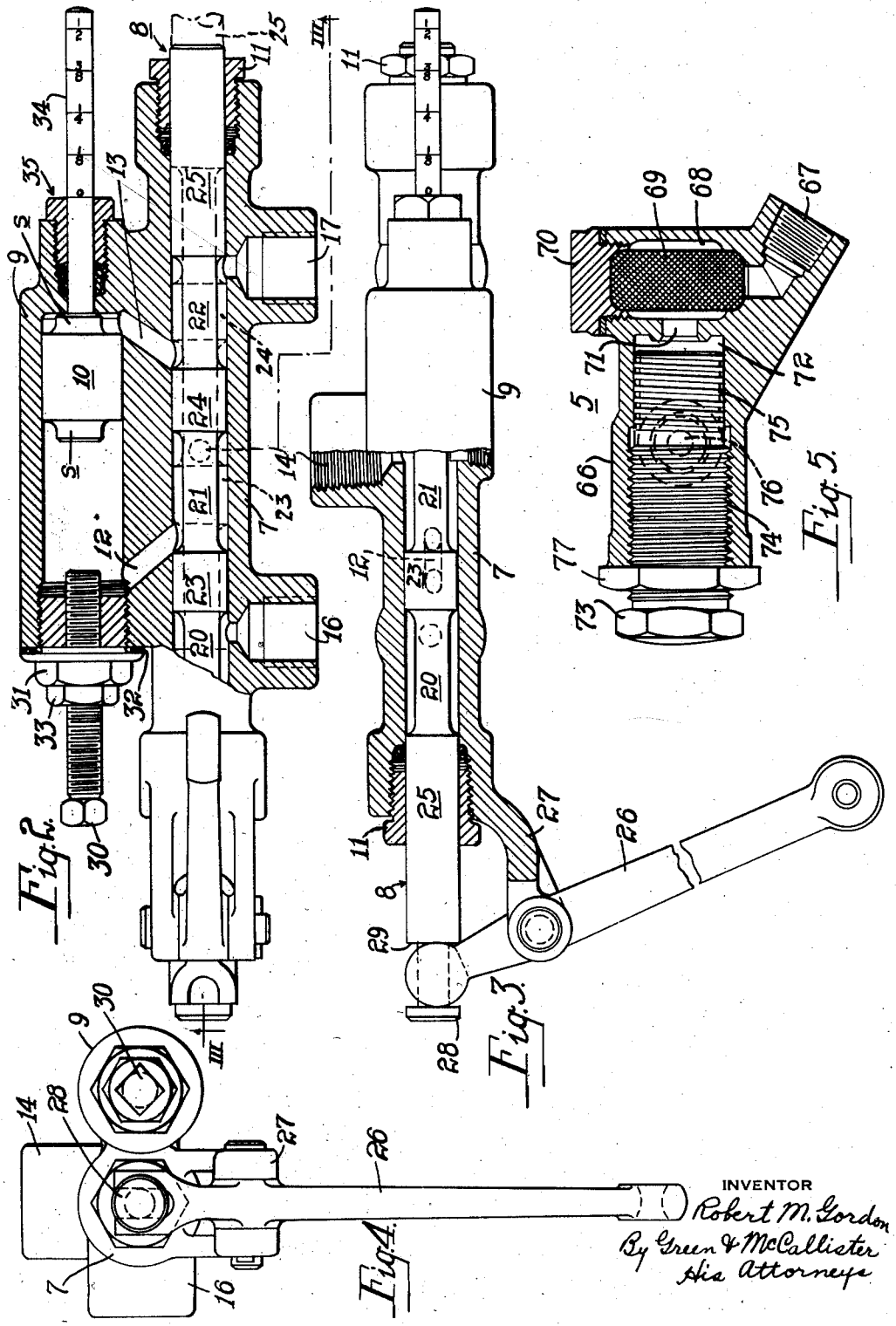

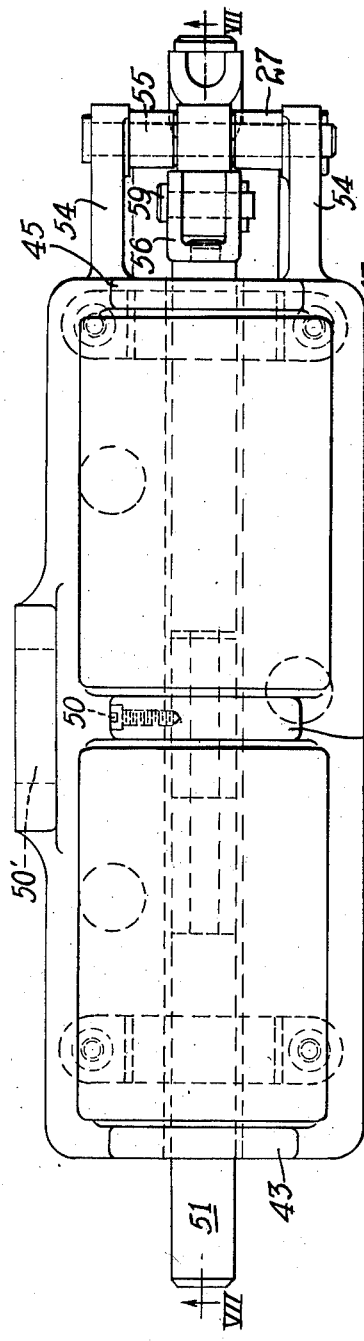
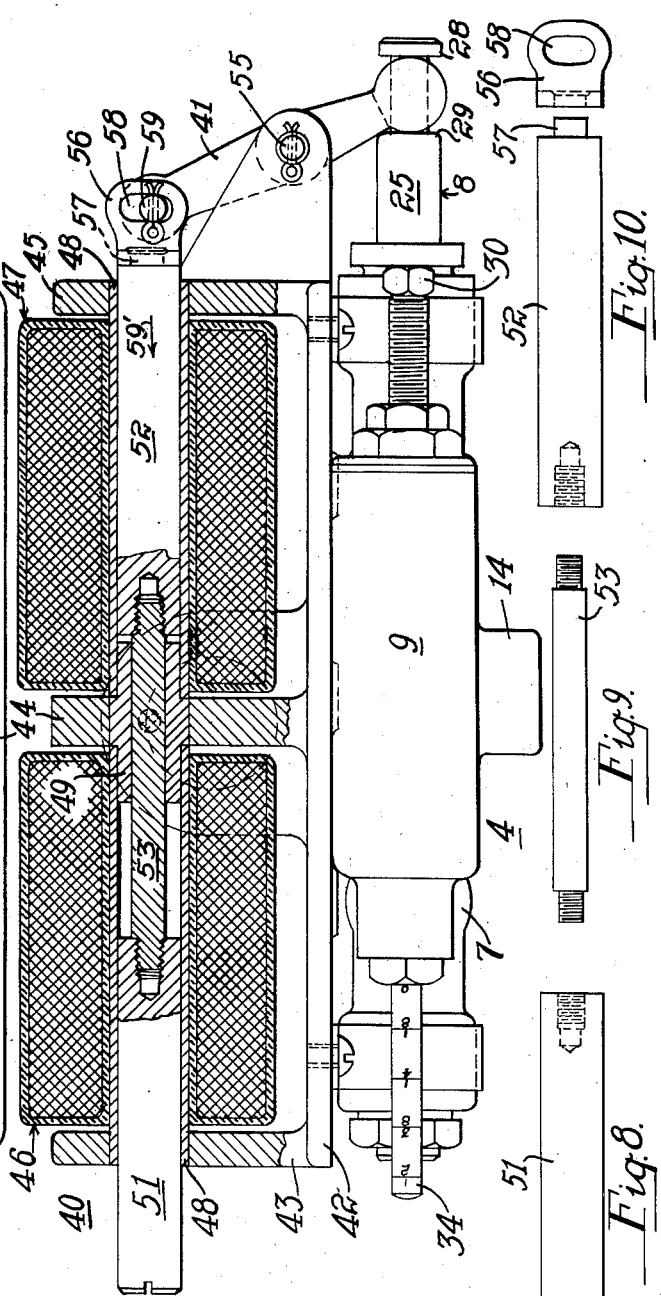

Patented Apr. 3, 1934

1,953,222

UNITED STATES PATENT OFFICE 1,953,222

LUBRICATION SYSTEM

Robert M. Gordon, Carnegie, Pa., assignor to R. M. Gordon & Company, a corporation of Pennsylvania Application April 30, 1931, Serial No. 533,947

1 Claim. (Cl. 184—7)

This invention relates to systems for distributing lubricant, such as grease, from a source of supply over sending or conveying lines to points of application, such as bearings and the like.

An object of this invention is to provide for the application of lubricant, such as grease, to bearings and the like at such pressures that positive delivery of lubricant to the parts to be lubricated shall be assured.

Another object of the invention is to provide for the delivery of predetermined quantities of lubricant, to bearings and the like, either at preslected intervals, or continuously, and at such pressures that positive application of such lubricant to the parts to be lubricated shall be assured.

A further object of the invention is the provision of a system for the distribution of lubricant either at a substantially constant pressure and flow to parts to be lubricated, or intermittently in predetermined measured quantities, under pressure, to parts requiring lubrication.

A still further object of the invention is the provision of a valve whereby a measured quantity of lubricant may be delivered from a pressure line to bearings or other parts requiring lubrication.

Another object of the invention is the provision of a double-acting valve whereby a plurality of bearings or the lke may be served with measured quantities of lubricant from a pressure line.

And a still further object of the invention is the provision of valves of the type referred to above that may be operated either by mechanical or electrical operating devices.

These and other objects of the invention will be apparent to those skilled in the art from the following description taken in conjunction with the accompanying drawings in which:

Figure 1 is a diagrammatic organization view, partly in section, of a distribution system for lubricant, arranged and constructed in accordance with the invention;

Fig. 1a is an enlarged view in section of a reversing valve embodied in the system of Fig. 1;

Fig. 2 is an assembly view, partly in section, of a valve arranged and constructed in accordance with an embodiment of the invention;

Fig. 3 is a view, partly in section, of the same valve, looking in the direction of arrows III—III on Fig. 2;

Fig. 4 is an end view, in elevation, of the valve shown in Figs. 2 and 3;

Fig. 5 is an assembled view in section of a constant flow valve embodied in the system shown in Fig. 1;

Fig. 6 is a top plan view of a modified form of valve assembly;

Fig. 7 is a view partly in section of a modified form of valve taken on line VII—VII of Fig. 6;

Figs. 8, 9 and 10 are views in elevation of details embodied in the valve shown in Figs. 6 and 7; and Fig. 11 is a diagrammatic view of circuits and apparatus for initiating and controlling the operation of the valves shown in Figs. 6 and 7.

Throughout the drawings and the specification like reference characters indicate like parts.

Referring first to Fig. 1, a container 1 having therein a supply of semi-fluid lubricant, such as grease, is illustrated. A lid 2 for the container serves as a platform upon which portions of a pumping mechanism are supported and from which other portions are suspended. The pumping mechanism, which will hereinafter be described in detail, is arranged to deliver lubricant from the container at a suitable predetermined pressure to a sending or distribution line 3. A plurality of valves 4 and 5, connected to the distribution or sending line, deliver lubricant to bearings 6, or other parts requiring lubrication. The bearings or parts requiring lubrication may be located at different points in a machine or a series of machines forming part of the equipment of a manufacturing plant, for example.

While only one distribution line is shown, it is to be understood that a number of distribution lines may be employed depending upon the location and arrangement of the machines having bearings or other parts to be lubricated.

As illustrated in Fig. 1, valves 4 may be arranged to serve the bearings of a series of machines not shown. In some plants, a number of machines may be so arranged that the valves may be lined up and operated simultaneously to thereby lubricate all of the bearings at one time; or by employing the type of valve shown in Figs. 6 and 7, in connection with the control scheme shown in Fig. 11, the valves may be operated at predetermined time intervals, in which case, only one valve need be operated at any particular time.

Valves 5, connected to the supply or distribution line 3, are arranged to deliver a constant flow of lubricant to the bearings or other parts served thereby.

In Figs. 2, 3 and 4, the details of construction and the arrangement of parts embodied in valves 4 are illustrated. Each valve 4 comprises a valve body 7 having a piston valve 8 therein, and a measuring chamber 9 having a piston 10 slidably disposed therein. Opposite ends of valve 8 protrude through packing glands 11 located at opposite ends of the valve body.

Valve body 7 may be provided with spaced ports 12 and 13 that communicate with opposite ends of the measuring chamber and with the interior of the valve body.

An inlet port 14 formed in one side of the valve body and located preferably between the ports 12 and 13 is connected by a pipe 15 to the sending or distribution line 3 whereby, as the piston valve is alternately moved from one position to another, the lubricant may be caused to flow alternately through ports 12 and 13 into the measuring chamber.

Since the lubricant enters the measuring chamber under pressure, the piston 10 will be forced first to one end and then the other of the measuring chamber, causing any grease or lubricant in front of the piston to be forced out of the port towards which it moves, through the interior of the valve body and thence to the bearings or parts to be lubricated.

The valve body is provided also with outlet ports 16 and 17 which are connected by pipes or conduits 18 and 19 to the respective bearings 6. The lubricant or grease discharged from the measuring chamber by piston 10 flows alternately through one and then the other of ports 16, 17 to the bearings.

As shown in Figs. 2 and 3 the piston valve 8 is substantially cylindrical in form and has a snug fit with the bore of the valve body except at a plurality of sections 20, 21 and 22 where the diameter thereof is reduced. Sections 23, 24 and 25 at the ends of the reduced sections of the piston valve act as pistons mounted on a common piston rod. As will be observed by inspection of Figs. 2 and 3, the reduced sections of the piston valve are so positioned or located that when the piston valve occupies the position shown in full lines in the drawings, lubricant will flow from the inlet port 14 over and around reduced section 21 of the piston valve, through port 12 into the left hand end of the measuring chamber 9.

In order to prevent leakage of lubricant or grease past sections 23, 24 and 25 of the piston valve, these sections are made relatively long. Since these sections are relatively long and fit snugly within the bore of the valve body, such high resistance is offered to the leakage of grease past them to the packing glands and to the ports 12 and 13, that substantially no leakage will take place.

Since the lubricant entering the measuring chamber is under pressure, piston 10 will be forced to the right-hand end of the chamber as shown in Fig. 2. When piston 10 is at the right-hand end of the measuring chamber, the space between the left-hand end of the piston and port 12 will be filled with a measured quantity of lubricant.

If piston valve 8 is moved to the right, as viewed from the drawings, to the position indicated in broken lines, inlet port 14 will be in communication with port 13. Therefore grease or lubricant will flow from the supply line 3 through inlet port 14 into the valve body over and around reduced section 21 of the piston valve, through port 13 and into the right-hand end of the measuring chamber. When the piston valve 8 is in the position indicated in broken lines, piston 10 will be forced to the left, forcing the lubricant ahead of it out of the measuring chamber through port 12, over and around section 20 of the piston valve, thence from the valve body through outlet port 16 and pipe 18 to the bearing to be served.

When the piston 10 has reached the left-hand end of the measuring chamber, the space between the right-hand end of the piston and the right-hand end of the chamber will be filled with a measured quantity of lubricant or grease, and this quantity of lubricant or grease will be stored in the measuring chamber until the piston valve 8 is moved to the position shown in full lines in Figs. 2 and 3. When the piston valve is moved to this position, the lubricant or grease will flow from the distribution line 3 through inlet port 14 into the valve body, thence through port 12 into the measuring chamber forcing piston 10 to the right. As the piston moves to the right the grease or lubricant previously stored in the chamber will be forced out of the measuring chamber through port 13, the valve body, outlet port 17 and pipe 19 to the bearing or parts served thereby.

From the above it will be apparent that in response to each operation of the piston valve a measured quantity of lubricant will be stored in the measuring chamber of the valve while another measured quantity of lubricant or grease is being forced from the measuring chamber to a bearing or other part to be lubricated.

The piston valve may be operated mechanically, as shown in Figs. 1, 2, 3 and 4. And for this purpose a lever 26 is provided which is pivotally mounted on a bracket 27 formed as an extension of the left-hand end of the valve body. As shown, the upper end of lever 26 is of yoke shape and straddles the outer end of the piston valve. The yoke of lever 26 operates between a flange 28 formed at the extreme end of piston valve 8 and a shoulder 29 spaced inwardly from the flange. By turning the lever on its fulcrum or pivotal support on bracket 27, the piston valve may be reciprocated within the valve body to effect delivery of a measured quantity of lubricant alternately from ports 16 and 17 to the bearings served thereby.

In order that the amount of lubricant or grease delivered to the bearings or parts to be lubricated may be measured, regulated or adjusted, an adjustable stop 30 is provided. Stop 30 has screw-thread engagement with a cap 31 that serves to close the left-hand end of the measuring chamber. The cap has screw-thread engagement with the measuring chamber so that it may be removed to permit removal and replacement of piston 10 operating in the measuring chamber. A gasket 32 may be employed to secure a grease tight joint between the cap and chamber 9. By turning the stop 30 into or out of cap 31, movement of piston 10 towards the left-hand end of the measuring chamber may be arrested at any predetermined point. When stop 30 has been adjusted to the proper position it may be locked in place by a lock nut 33.

In order that piston 10, when at one or the other of its extreme positions, shall not close ports 12 and 13, cylindrical bosses S are formed on the opposite ends of the piston, but of small diameter as shown.

It will be apparent that by limiting the movement of the piston 10 towards the left-hand end of the cylinder, the volume of the space between the right-hand end of the piston and the right-hand end of the measuring chamber may be adjusted to predetermined values within the range permitted by the size of the measuring chamber.

In order that it may be ascertained with certainty that lubricant is being delivered to the bearings or parts served by valves 4, and the amount delivered, it is desirable to employ calibrated indicating devices. A visible indicating means often being more practicable, a visible indicator 34 is provided. As shown, the indicator may comprise a stem or rod, one end of which is attached to a boss S of piston 10. The other end of the stem protrudes through a stuffing box 35 and out of the measuring chamber so as to be visible. The indicator stem 34 is preferably of such length so that when piston 10 is in the position shown in full lines in the drawings, the outer end of the stem extends outwardly of the stuffing box, thereby indicating that the piston has moved to that position in which lubricant is forced out of port 17 of the valve body through pipe 19 to the bearing served thereby.

When the piston 10 has been actuated to the left-hand end of the measuring chamber, indicator stem 34 will lie almost wholly within said chamber thereby indicating that lubricant has been forced out of port 16 of the valve body through pipe 18 to the bearing served thereby.

In order that the operator may know, when he adjusts stop 30, how much lubricant will be delivered to the bearings, each time the valve is operated, stem 34 may be calibrated, as indicated. The graduations indicated thereon may be in ounces or fractions thereof, depending upon the capacity of the measuring chamber.

By this form of indicating means the operator or attendant may know positively, not only that lubricant has been delivered by the valve, but, also, the particular bearing or part that has been lubricated and the amount delivered thereto. If the piston valve is actuated and the stem 34 of the indicator moves in response thereto, the operator or attendant will know that the valve is receiving lubricant from the distribution line 3. If, however, the indicator does not move in response to operation of the piston valve, the operator or attendant will know that the valve is not receiving lubricant from the distribution line.

In practice, the measuring chamber and the valve body may be cast as an integral part as shown in the drawings. A simple unitary structure may, therefore, be provided and easily applied in a distribution system of the type illustrated in Fig. 1.

Where a series of bearings or a series of machines having bearings so located that valves 4 may be located approximately in line, a mechanical arrangement, such as shown in Fig. 1 may be employed to operate all of the valves simultaneously. Such an arrangement may comprise a cable 36 pin connected to the lower end of valve operating levers 26 and hand operated levers 37 and 38 connected to the opposite ends of the cable. With an arrangement such as shown in Fig. 1, an operator or attendant may turn one of the levers 37—38 to the position shown in Fig. 1 whereby all levers for operating the several valves will be moved to the position shown in Fig. 3. In this position the bearings served by ports 17 of valves 4 will be lubricated.

If one or the other of the levers 37—38 is turned to the position indicated by broken lines 39, the piston valves of the several valves will be actuated to the position in which the bearings served by ports 16 of the several valves will be lubricated.

Instead of operating valves 4 by an arrangement, such as shown in Fig. 1, each valve may be provided with an electro-magnetic device 40. When an electro-magnetic device 40 is employed, a modified form of lever 41 (see Figs. 6 and 7) may be substituted for the lever 26 embodied in the device shown in Figs. 1 to 4, inclusive.

The electro-magnetic device comprises a base 42 of magnetic material having uprights or flanges 43, 44 and 45 thereon so spaced that solenoids 46 and 47 may be disposed therebetween. Each solenoid is mounted on a sleeve 48 preferably of non-magnetic material, such as brass or copper. As illustrated, the outer ends of the sleeves are mounted in openings in uprights 43 and 45 while the inner ends thereof are mounted on a bearing 49 disposed in an opening in upright 44, the bearing being secured in place by a set screw 50. The terminals of solenoids 46 and 47 may be brought out through an opening 50' in base 42 and connected to a source of electric current.

A core structure comprising sections 51 and 52 of magnetic material connected by a section 53 of non-magnetic material are arranged to operate within sleeve 48 on which the solenoids are mounted. A cover may be secured to the base 42 to protect the solenoids from exposure.

Base 42 is also provided with spaced bracket arms 54 between which lever 41 is disposed. A pin 55 passes through the arms and the lever, and serves as a fulcrum therefor.

As illustrated in Figs. 6, 7 and 8, core section 52 is provided at its outer end with a yoke 56 that is secured to the core section in any suitable manner as by peening over a reduced end portion 57 thereof. Yoke 56 is provided with an elongated slot 58 for accommodating a pin 59 extending through the outer end of the valve lever 41. As the core section for solenoids 46 and 47 moves back and forth through the solenoids, the pin will move along the slot in the yoke as the valve operating lever 41 is turned on its pivotal support.

When solenoid 46 is energized, core section 51 will be drawn inwardly, by the magnetic field developed by the solenoid, from the position shown in full lines in Fig. 7. In this position lever 41 which is arranged to operate the piston valve 8 will move the piston valve to the left, as viewed from Figs. 6 and 7 to a position that corresponds to the position of the piston valve illustrated in broken lines in Figs. 2 and 3. When in this position, lubricant is supplied to the bearings served from port 16 of the valve.

When solenoid 47 is energized, core section 52 will be moved inwardly of this solenoid thereby actuating valve operating lever 41 in the direction of arrow 59' whereby the piston valve will be moved to the right, as viewed from Figs. 6 and 7 to a position that corresponds to the position of the piston valves indicated in full lines in Figs. 2 and 3. When piston valve 8 is in this position, the bearings or parts connected to port 17 of the valve will be supplied with a measured quantity of lubricant.

When a valve structure such as shown in Figs 6 and 7 is employed, each valve of the system may be operated individually at predetermined intervals by means of a circuit controlling device 61 that is driven by a motor 62, preferably an electric motor. The circuit controlling device may comprise a drum having a plurality of contact segments 63 thereon connected by jumpers 64 arranged to energize the solenoids associated with the respective valves as the drum rotates. By properly spacing the contact segments on the drum and by adjusting the speed at which it is driven, the valves may be operated individually and at predetermined times. While a particular form of circuit controlling device has been illustrated for energizing the solenoids of the valves, at predetermined intervals, any form of circuit controlling device may be employed to affect the desired sequence and time operation of the valves.

In Fig. 5 of the drawings, the constant flow valve 5 is illustrated in detail. As there illustrated the valve comprises a body 66 having an inlet port 67 terminating in a chamber 68 in which a strainer 69 for lubricant is located. Chamber 68 is closed at one end by a removable cap 70 to facilitate removal and replacement of the strainer.

The strainer chamber communicates through a passage 71 with a chamber 72 in which a flow regulating valve 73 is disposed. The flow regulating valve comprises a complex screw, the upper portion of which has screw-thread engagement with the interior of the valve body, as indicated at 74 and the lower portion of which is provided with screw threads 75, preferably square or rectangular in form. The portion of the valve body cooperating with the square thread portion of the valve has a plain cylindrical inner surface so that the square threads in combination with such interior surface forms a helical passageway through which lubricant may flow to outlet port 76 of the valve.

By turning valve 73 into and out of the valve body the length of the helical passageway, formed by the square threads and the adjacent cylindrical surface of the valve body, may be increased or decreased in length thereby increasing or decreasing the resistance to the flow of lubricant therethrough and hence the quantity of lubricant that flows to the bearings or parts to be lubricated. When a valve, such as this, is employed in the system indicated in Fig. 1, valve 73 is adjusted in the valve body until the proper amount of lubricant is delivered to the bearings or the parts to be lubricated. When the proper adjustment is obtained, the valve may be locked in place by means of a lock nut 77.

From the above description of the system and the valves 4 and 5 employed to distribute lubricant to the various bearings or parts requiring lubrication, it will be apparent that each time valves 4 are actuated a single charge of lubricant is delivered to a bearing while valves 5 operate to permit a regulatable constant flow of lubricant to the bearings or parts served thereby. Valve 4 may, therefore, be referred to as a double-acting one shot valve and valve 5 may be referred to or designated as an adjustable constant flow valve.

The pumping mechanism carried by the cover or lid of the container shown in Fig. 1, and employed to deliver lubricant to the distribution or sending line 3 at the proper pressure, is illustrated and described in detail in a copending application, Serial No. 431,162, filed by William J. Kearns and Robert M. Gordon on the 25th day of February, 1930.

While it is preferred to employ the form of pumping mechanism disclosed in said copending application, it is to be understood that other forms of pumping mechanisms may be used so long as such mechanisms are capable of delivering lubricant to the distribution line at the proper pressure and volume required by the system.

The pumping mechanism includes a cylinder 80 which is erected on the lid 2 of the container. The upper end of the cylinder is closed while its lower end communicates with the interior of the container through a packing gland 81.

A piston 82 is disposed within the cylinder 80 and is provided with a piston rod 83 that extends down through the packing gland into the container. The lower end of the piston rod carries a piston 84 that works in a vertically disposed lubricant or grease pump cylinder 85. The cylinder 85 may be supported from above by means of struts 86 secured to and depending from lid 2.

The lower end of the grease cylinder is provided with an inwardly opening drop valve 87 through which grease may enter by suction during the up-stroke of the piston 84.

To render the grease pump double-acting, a chamber 88, disposed in parallelism with cylinder 85 and connected therewith at its upper end by a port 89, is provided.

The bottom of chamber 88 is provided with an inwardly opening drop valve 90 for the admission of grease, by suction, to the chamber and to the cylinder 85 during the down-stroke of the piston. The cylinder 85 and the chamber 88 may be cast integrally as shown in Fig. 1.

The bottom of the cylinder and chamber structure is sufficiently elevated above the bottom of the container to provide clearance for the operation of the valves 87 and 90.

Cylinder 85 is provided at its top and bottom with discharge ports 91 and 91' that are connected by pipes 92 and 93 to a vertically disposed delivery pipe 94 that extends upwardly through the lid 2 for connection to the distribution or sending line 3. Pipes 92 and 93 are provided with check valves 95 to prevent back flow into cylinder 85.

In order that piston 82 working in cylinder 80 may be caused to reciprocate, ports 96 and 97 are provided at its upper and lower ends for the admission of fluid under pressure, preferably oil. Fluid under pressure may be delivered alternately to ports 96 and 97 by means of a pump 98 and a reversing valve 99. While any suitable form of pump may be employed, it is preferred that a rotary pump be utilized and this pump may be driven by an electric motor 100.

The reversing valve comprises a cylinder or casing 101 in which pistons 102 and 103, mounted on a common rod 104, in spaced relation, are disposed. Rod 104 extends through the lower head of the casing or cylinder through a hole in the lid 2.

At one side of and at approximately the center of the casing, a port 105 is provided that is connected by a pipe 106 to the discharge port of the pump 98. The ends of the valve casing are provided with ports 107 and 108 that are connected by pipes 109 and 110 to the intake port of the pump.

The opposite side of the valve casing 101 is provided near its ends with ports 112 and 113 that are connected to the ports 96 and 97 of the cylinder 80 by pipes 114 and 115, respectively. The pipes 114 and 115 may be provided with suitable pressure regulating valves 116.

The pumping system comprising the cylinder 80, the valve casing 101 and the pump 98 is filled with a non-compressible fluid preferably oil. The system as disclosed is a closed system, so to speak, so that while fluid is being pumped into cylinder 80 on one side of the piston 82, fluid stored in the cylinder at the opposite side of the piston is drawn off by the pump and forced into the other end thereof. Thus while one end of the cylinder 80 is receiving fluid at a working pressure, the other is acting as a storage chamber, the contents of which are gradually reduced by the pump which is forcing such fluid to the other side of the piston.

The relation of the pistons 102 and 103 on rod 104 to the ports 105, 112 and 113 is such that, when the pistons are at the end of their down-stroke and port 105 is in communication with port 113, oil is pumped from the upper end of cylinder 80 via ports 96, 112 and 107 and forced into the lower end of said cylinder via ports 113 and 97. Similarly, when the valve pistons are at the end of their up-stroke, port 105 is in communication with the port 112, and port 97 with the ports 113 and 108; thus oil under pressure is pumped from the lower end of cylinder 80 and into the upper end thereof.

It will thus be seen that by shifting the pistons 102 and 103 periodically, the piston 82 in cylinder 80 will be caused to reciprocate. As the piston 82 reciprocates, the piston 84 working in grease cylinder 85, will reciprocate and thus grease will be discharged alternately through ports 91 and 91' of the cylinder into and through pipe 94 to the distribution or sending line 3 and thence to the various valves 4 and 5.

In order that the pistons in the piston valve 99 may be actuated to reverse the direction of application of the oil under pressure to the cylinder 80 as the piston therein reaches the end of its "up" and "down" strokes, respectively, the lower end of valve rod 104 is connected for operation to a toggle mechanism 115 arranged to be operated by dogs 116 and 117 mounted on piston rod 83.

The toggle mechanism comprises a lever 118 slidably mounted on a pin 119 carried by a stirrup 120 suspended from the lid of the container, and a lever 121 which is pivotally mounted between its ends on strut 86. Adjacent ends of these levers are pivotally connected by a pin 122. Lever 118 is provided with an elongated slot 123 through which the pin 119 extends, so that said lever may turn and move longitudinally on said pin. The free end of lever 121 is disposed in the path of movement of the dogs 116 and 117 carried by piston rod 83.

A pin 125 carried by the lower end of valve rod 104 operates in slot 122 of lever 118. A tension spring 126 connected to levers 118 and 121 at opposite sides of the toggle joint operates to throw the toggle mechanism over center when the dogs 116 and 117 have turned levers 118 and 121 slightly past this straight line position. When the toggle levers occupy a straight line position, the spring is so stretched that the moment the toggle joint is broken, the spring contracts thereby actuating said levers either to the position indicated in full lines in the drawings or to the position shown in broken lines depending upon the direction in which dogs 116 and 117 are moving.

It will be apparent that with the dogs 116 and 117 properly positioned on the piston rod 83, the levers of the toggle mechanism will be alternately thrown in opposite directions, as indicated by the full and broken line positions as the piston rod rises and descends thus reversing the control valve 99. Whenever the toggle levers are thrown past their straight line position, in either direction, by the dogs 116 and 117, the spring 126 will cause the levers to snap into one or the other of their extreme positions of angularity.

From the above it is evident that when motor 100 is started, the pump mechanism will at once function, and grease or lubricant will be pumped into the distribution line serving the valves of the system.

While various modifications and changes may be made in the lubricating system and the valves embodied therein, without departing from the spirit and the scope of the invention, it is to be understood that only such limitations shall be placed on the invention as are imposed by the prior art and the appended claim.

What I claim as new and desire to secure by Letters Patent is:

A valve comprising a housing having a bore, a piston valve operable in said bore, and a measuring chamber having a piston movable in said chamber, said housing having passageways communicating with the bore and the ends of said chamber, said housing having an inlet port communicating with said bore between the passageways, and two outlet ports, said piston being so arranged that when moved to one position the inlet port communicates with said chamber at one end while the other end thereof communicates with one of said outlet ports, and when moved to another position the inlet port communicates with said chamber at the other end thereof, while the opposite end of said chamber communicates with the other of said discharge ports, two solenoids mounted on said valve, said solenoids each having movable cores connected in tandem, means for alternately energizing said solenoids to thereby reciprocate said tandem cores, and a pivotally mounted lever connecting said cores and piston valve, whereby said valve is reciprocated as the cores reciprocate.

ROBERT M. GORDON.